Figure 3:
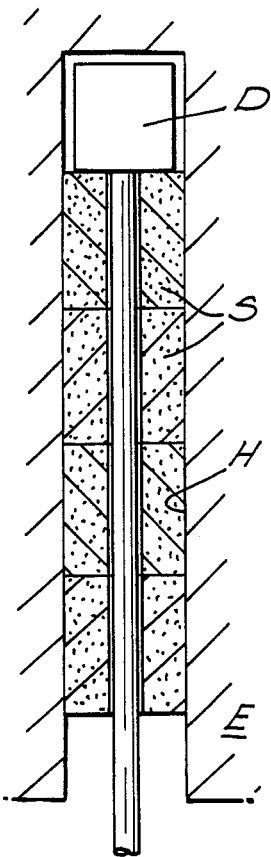

United States Patent [19]

Cranko et al.

[11] Patent Number: 4,899,972
[45] Date of Patent: Feb. 13, 1990

[54] ANCHORING

[76] Inventors: Ernest Cranko, P.O. Box 3850, Alrode, Transvaal 1451, South Africa; Roger K. Moore, 18 Chandlers Close, Crabs Cross, Redditch, Worcestershire, B97 5HU, England

[21] Appl. No.: 7,685

[22] Filed: Jan. 28, 1987

[30] Foreign Application Priority Data

| Jan. 31, 1986 | [GB] | United Kingdom | 8602471 |
| May 3, 1986 | [GB] | United Kingdom | 8610924 |
| May 3, 1986 | [GB] | United Kingdom | 8610925 |
| Oct. 17, 1986 | [GB] | United Kingdom | 8624882 |

[51] Int. Cl.$^4$ ............................................. E21D 21/00
[52] U.S. Cl. ................................. 248/231.91; 248/544; 405/259
[58] Field of Search ............... 248/231.9, 231.91, 343, 248/231.2, 231.3, 339, 544; 403/227, 225; 411/34, 35, 36, 37, 38, 15, 907; 52/698; 405/259, 260, 261

[56]  References Cited

U.S. PATENT DOCUMENTS

| 1,318,584 | 10/1919 | Peirce | 411/15 |
| 1,919,666 | 7/1933 | Patterson | 411/34 X |
| 2,950,602 | 8/1960 | Lang | 405/259 X |
| 3,012,405 | 12/1961 | Caron | 106/74 X |
| 3,082,578 | 3/1963 | Lindstaedt et al. | 411/15 X |
| 3,304,829 | 2/1967 | Raynovich, Jr. | 405/259 X |
| 3,651,651 | 3/1972 | Triplett | 411/34 |
| 3,754,401 | 8/1973 | Lipow | 405/259 |
| 4,472,088 | 9/1984 | Martin | 52/698 X |

FOREIGN PATENT DOCUMENTS

| 832359 | 7/1938 | France | 411/38 |
| 1312011 | 11/1962 | France | 411/37 |
| 91510 | 4/1958 | Norway | 411/34 |
| 548698 | 10/1942 | United Kingdom | 411/34 |

Primary Examiner—Ramon S. Britts
Assistant Examiner—Karen J. Chotkowski
Attorney, Agent, or Firm—Caesar, Rivise, Bernstein, Cohen & Pokotilow, Ltd.

[57] ABSTRACT

An anchor element is provided with a body of bonded particulate material e.g., a sleeve of silicate bonded sands. The element is received in a borehole with the sleeve adjacent the blind end. When a compressive force is applied between the ends of the body, the particles move closer together to form an annulus of compacted particulate material bridging the element and the wall of the borehole.

10 Claims, 4 Drawing Sheets

FIG. 1
FIG. 2
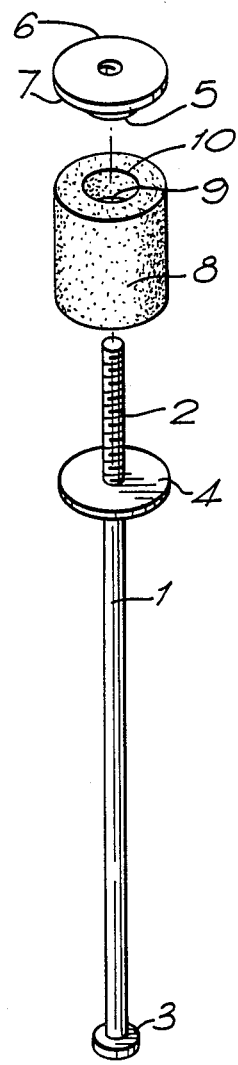
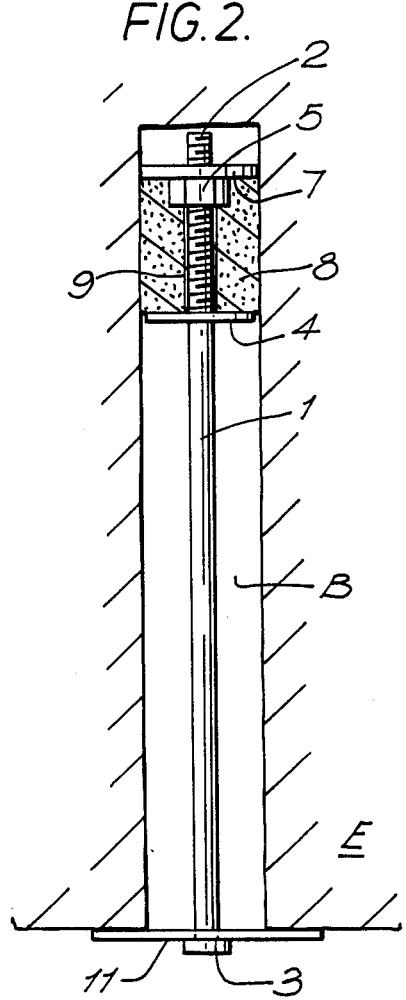

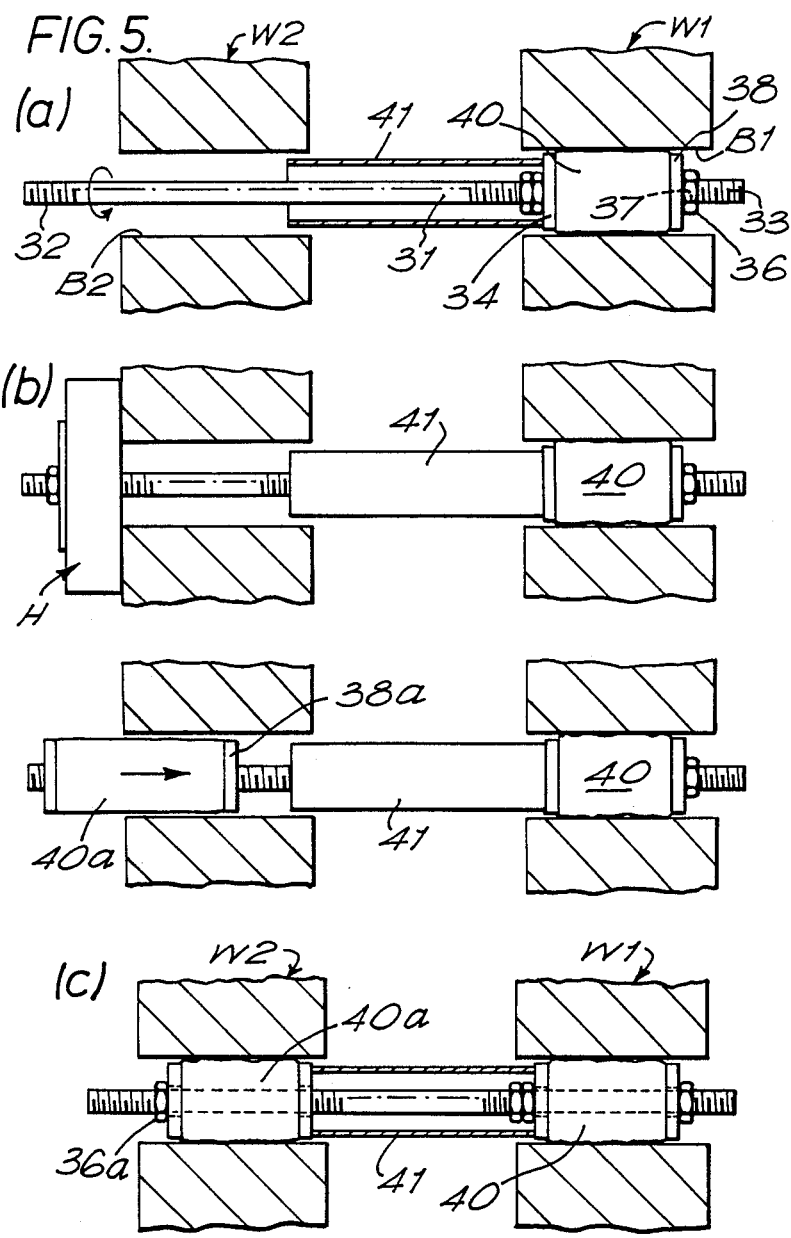

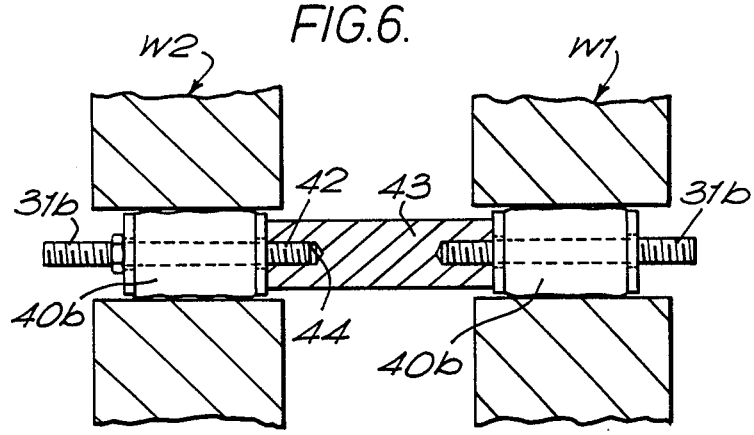
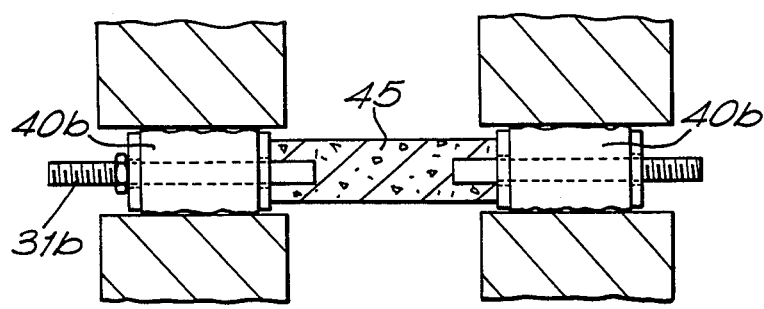

ANCHORING

The invention relates to anchoring, and in particular to an anchor element to be anchored in a borehole in a substrate and to a method of anchoring the element in the borehole.

It is known to locate an expandable sleeve about an element in the annulus between an anchor or fixing element and the wall of the hole in which it is received and apply a force e.g. an axial force, to expand the sleeve. Sleeves of wood substitute have been proposed, see GB-A-219744 and of plastics such as polyvinyl chloride, see GB-A-2118234 and GB-A-2132299. Such sleeves have relatively low load bearing capacity and cannot easily be made cheaply.

The invention is based on the realisation that if the sleeve or like item is formed of a bonded particulate material certain advantages result.

According to this invention in one aspect an elongate anchor element is characterised in that a body of bonded particulate material is present about a length portion of the element and in that means are present at opposite ends of the body to transmit a compressive force to the body to overcome the bonding of the particulate material to compact the particulate material to form a load bearing annulus about the element.

By the term "bonded" we mean that the particles are held together by a relatively weak bonding force and spaces are present between the particles so that, under force, the particles are caused to move closely together. This is in contrast to a system such as a set concrete in which the particles are held in a matrix which retains the particles in set relative positions. When a body of bonded particulate material according to the invention is subjected to an axial force, the bonding forces within the body are overcome and the particles move closer together. Because in use the force is applied between the ends of the body, the length thereof decreases, and the particles move to fill the annular clearance between the wall of the borehole and the anchor element. The compacted particles form a load bearing annulus between the wall of the borehole and the anchor element. In this way a satisfactory load bearing anchorage is readily formed and a load may be applied to the anchorage without any delay. The bonding of the particulate material in the body has acted as a means of holding and transporting the particulate material to the required position. After compaction of the particulate material the body has lost its integrity as a result of the application of the compressive forces.

The bonding of the particulate material is preferably a chemical bonding and will be related to the selected particulate material. The nature of the bonding means is not critical so long as the bonding is effective and, if the body is to be stored, will not deteriorate. Chemical bonding agents are preferred and for sand bonding agents such as silicates, optionally with organic or gas hardeners, are preferably used.

The particulate material of the body may be any material or blend of materials which can be compressed to form the load bearing annulus between the anchor element and the walls of the borehole. The particulate material will be one which can withstand the applied compacting force and which will provide a load bearing compacted mass. It is preferred to use materials which have a high resistance to crushing. This can be determined by an aggregate crushing value as measured by BS812 crushing test; a value of about 10 is preferred. For effective compaction the particles preferably are angular or sharp. For economy we prefer to use a blend of sands, but other materials such as coal dust, aggregates, gravel, slags may be used.

To facilitate the engagement the diameter of the body should be substantially equal to or slightly less than that of the borehole. The body will be provided with means whereby it may be engaged with the element e.g. fitted between the plate and the nut, such as a smooth walled or threaded through hole. To facilitate engagement of the nut and facing end of the body, the mouth of the through hole may be depressed. The nut has a head dimensioned to be received in the borehole and usually slightly less in diameter than the diameter of the borehole. The head is of disc or washer form, and may be at an end of the nut or about its middle. The nut may be made in one or two pieces.

According to a more specific aspect of the invention there is provided an anchor element to be a anchored in a borehole at the blind end thereof, the element comprising an elongate bolt having a threaded end portion, a threaded nut in engagement with the threaded end portion of the bolt, characterised in that the nut includes a head of a diameter substantially equal to that of the borehole, a plate is mounted on the bolt towards the threaded end portion, and a generally cylindrical body extends between the plate and the nut, the body being formed of bonded particulate material.

It is another feature of the invention that the anchor element may be used as a low load fixing device if the element is suitably dimensioned and the end of the element nearest the mouth of the borehole is shaped to act as a support and, in a preferred feature, if that end is shaped so that the bolt may be hand rotated into position.

According to another aspect of this invention there is therefore provided an anchor element comprising a supporting device to be anchored in a borehole at the blind end thereof, the element comprising an elongate bolt having a threaded end portion to be located at the blind end of the hole, a threaded nut in engagement with the threaded end portion of the bolt, characterised in that the nut includes a head of a diameter substantially equal to that of the borehole, a plate is mounted on the bolt towards the threaded end portion, and a generally cylindrical body extends between the plate and the nut, the body being formed of bonded particulate material, and in that the end of the bolt remote from the threaded end is shaped to act as a support.

The end of the bolt remote from the threaded end, i.e., the end which in use is adjacent and typically protudes from the mouth of the borehole, may be any shape which acts as a support or retaining device and provides a hand gripping facility. For example, the end may be shaped as a hook or eye, or it may be of U form as in a pipe or cable clamp.

It is another advantageous feature of the invention that the bolt can be used as a wall tie with certain advantages.

According to another aspect of the invention there is therefore provided an anchor element, a body located about a length of the anchor element, characterised in that a plate is present at each end of the body, the plate being of substantially the same diameter as the body, and in that the body is formed of bonded particulate material, and in that one plate can be urged towards the other to compact the body and cause the particles thereof to move closer together.

According to another aspect of the invention there is provided a method of point anchoring an anchor element in a borehole characterised by placing an anchor element as defined in the borehole, and applying a compressive force to the body of bonded particulate material to compact the particulate material to form a load bearing annulus between the anchor element and the wall of the borehole.

The compressive force may be rotational or axial. For example, a bolt may be rotated to draw a nut on to the sleeve and compress it between a plate or a pipe may be urged along the bolt to compress the sleeve between the plate and an upper stop member.

In one particularly advantageous feature of the invention, the body is in the form of sleeves of the bonded particulate material and the sleeves extend in a column from the distal end of the point anchoring element towards the mouth of the borehole.

According to another aspect of the invention there is therefore provided a method of anchoring an elongate anchor element in a borehole, the method comprising (i) locating the anchor element in the borehole and securing the distal end of the element in the blind end of the hole, (ii) placing about the element and in the annulus between the element and the borehole wall one or more sleeves formed of bonded particulate material, (iii) applying a compressive force to the proximate face of the sleeve nearest to the borehole mouth to compact the particulate material in the nearest sleeve or in that sleeve and other sleeves to increase the load carrying capacity of the anchorage.

The borehole may have any orientation e.g. upward, downward, vertical or at angle, or horizontal.

The borehole may be formed in any substrate such as rock, concrete, earth, wood and other material so long as a relatively accurate hole can be formed, e.g., drilled, therein.

The invention offers several advantages. The anchor element may be point anchored quickly and efficiently to provide a high load bearing capacity e.g. about 5 tons. The element is cheaper and more reliable than an all metal anchor element and can be installed with equal or faster speed. The element can be installed and loaded much more quickly than in the case of a chemically setting system, e.g., a resin or cement grout. The metal components of the anchor element can, where necessary, be recovered and reused, employing a fresh body. The invention includes, as a new item of commerce, a body as defined.

Figure 4:
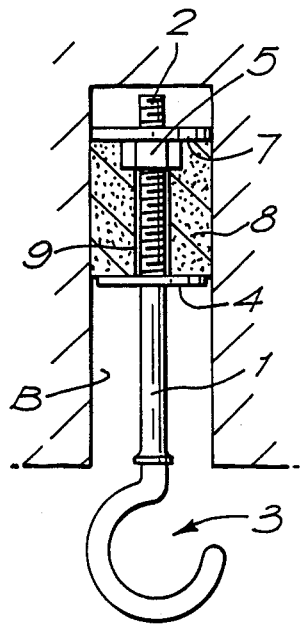

In order that the invention may be well understood it will now be described by way of example only with reference to the accompanying diagrammatic drawings, in which FIG. 1 is an exploded perspective view of an anchor element, FIG. 2 is a sectional view of the element of FIG. 1 in anchored condition, FIG. 3 is a sectional view through another anchorage, FIG. 4 is a sectional view of another element in anchored condition, FIG. 5 shows diagrammatically successive stages making one wall tie of the invention, FIG. 6 shows another wall tie, and FIG. 7 shows another wall tie.

The same reference numerals are used wherever possible in the description of the different embodiments.

The anchor element comprises a bolt 1, which may range from 10 cm to about 5 meters in length and from 8 mm to 32 mm in diameter. The bolt 1 is formed of a steel but it may be formed of a strand, rod, wire rope or the like or even a synthetic material, e.g. KEVLAR rope (KEVLAR is a trade mark). As shown, one end of the bolt, the upper end in use, is threaded as at 2, and the threaded length may range from about 10 mm to about 350 mm. The other end of the bolt has a forged head 3, although this may be of other shapes, including threaded. An annular plate 4 is secured e.g. welded or otherwise fixed about the bolt 1 a short distance from the threaded end portion 3.

A nut 5 has a threaded bore 6 to engage the threaded length 2 of the bolt 1. The nut 5 has a disc shaped head 7, the diameter of which is equal to or slightly less than that of a borehole B, FIG. 2, so that the nut will engage the opposite walls of the borehole. The nut may be made by stamping, forging in one piece or it may be made in two pieces.

A cylindrical body 8 is formed of chemically bonded graded sands. The body has a through hole 9 having a conical mouth 10 at one end. The body 8 may measure about 100 mm long, and has a diameter of about 16 mm to receive a 14.5 mm bolt 1 in which case the diameter of the head 7 is 37 mm and the element is to be point anchored in a borehole about 38 mm diameter.

In use, the body 8 is loosely fitted on the bolt 1 to abut against the plate 4. The nut 5 is then loosely threaded on to the bolt threaded portion 2. A bearing plate 11 is then fitted on the end 3 of the bolt 1. The element is then urged up a borehole B in a substrate E. The element is then rotated to urge the nut 5 into closer engagement with the bolt, and to compress the body 1 into tight engagement with the facing side wall of the borehole B. The effect of the compression is to overcome the bonding force of the chemical bonding and to compact the body 8 whereby the particles are moved closer together so that the body 8 becomes shorter but wider, i.e., the particles are compacted to form an annulus between the element and the borehole B. Because the wider end of the nut 5 is substantially equal to the diameter of the borehole B, when the body 8 is compressed between the nut 5 and the plate 4 a high force is applied across substantially the entire surface area of each end of the body, so urging the compacted particles of the body 8 into high frictional contact with the facing side wall of the borehole B.

Referring now to FIG. 3, the distal end D of a steel anchor bolt 1 is secured in the blind end of a borehole B formed in a substrate E. As shown, the distal end D is secured in position by set resin, but other systems may be used such as a body according to FIGS. 1 and 2, or a cementitious composition or a mechanical anchorage such as an expansion shell. A plurality of sleeves S extends along the bolt 1 towards the mouth of the hole B, the sleeves S being arranged in end-to-end relation. In this way a column is formed between the bolt 1 and the facing wall of the hole B. The sleeves are formed of silicate bonded graded sands or graded aggregate.

The sleeves S are tamped in position either pneumatically or by hand to increase the friction between the bound particles, thereby to increase the load carrying capacity of the anchorage, up to the strength of the bolt 1.

The embodiment shown in FIG. 3 may be modified. For example, a single elongate sleeve S may be used and a plate, not shown, may be present to be urged against the proximate face of the lowest sleeve. The plate may have tangs or the like to bite into the wall of the hole B. The bolt may be pretensioned, dependent on the nature of the anchorage to be formed. The lower end of the bolt may extend through a plate across the mouth of the borehole and be threaded to carry a nut to be abutted against the plate. The lower end may also be shaped to act as a support.

In the embodiment of FIG. 4, the body 8 is loosely fitted on the bolt to lie on the plate 4. The nut 5 is then loosely threaded on to the bolt threaded portion 2. The element is then urged up a borehole B in a substrate E. The bolt 1 is then hand rotated using the hook portion 3, to urge the nut 5 into closer engagement with the bolt, and to compress the particles of the body 8 into tight engagement with each other and the facing side wall of the borehole B.

Because the wider end of the nut 5 is substantially equal to the diameter of the borehole B, when the body 8 is compressed between the nut 5 and the plate 4 a high force is applied across substantially the entire surface area of each end of the body, so urging the nut into high frictional contact with the facing side wall of the borehole B.

The body may be used in a line with other such bolts to hold a length of cable to the roof of a mine gallery.

As shown in FIG. 5, two walls W1 and W2, are to be joined together by a wall tie extending through a pair of aligned holes B1 and B2 in the facing walls W1 and W2. The wall tie includes an anchor element 31 such as a steel bar having threaded ends 32, 33. An annular plate 34 is located on the bar and is spaced a distance from one threaded end 33 and held there by a double nut 35. A nut 36 having a threaded bore 37 is dimensioned to engage the threaded end 33. The nut 36 has a plate 38 slightly smaller than the diameter of the hole B1. A cylindrical sleeve 40 is formed of chemically bonded graded sands, e.g., bonded by set sodium silicate. The sleeve 40 is fitted on the bar 31 between the plates 34 and 38. The bar 31 is much longer than the depth of the hole B1 in the wall W1. A length of sleeving 41 is located on the bar B1, extending from the plate 34 towards the threaded end 32; the length of the sleeving 41 corresponds to the distance between the walls W1 and W2.

In use, the bar 31 is urged through the wall W2 into the hole B1 in the wall W1 and is rotated to cause the sleeve 40 to engage the adjacent walls of the hole B1. As the bar 31 is rotated the sleeve 40 is axially compressed and because the sleeve is made of compactable bonded particulate material the bonding force is overcome and the particles of the sleeve 40 are urged closer together so that the compacted particles are engaged tightly with the walls of the hole B1 as shown in FIG. 5(b). The sleeve is then proof loaded to a preset limit by means of a hydraulic jack H. An annular plate 38a is fitted over the threaded end 32 followed by a second sleeve 40a, the same as sleeve 40. The second sleeve 40a is then loaded to be engaged with the wall of the hole B2 by tightening of the end nut 36a. In this way, a wall tie is formed to hold together the two walls W1, W2, and to the condition shown in FIG. 5(c).

In the embodiment of FIG. 6 each sleeve 40b has a short bar 31b having extensions 42 and the sleeving takes the form of a solid cylinder, 43, formed of ferrous or non-ferrous metal or plastics such as nylon, having holes 44 to receive the extensions. In the embodiment of FIG. 7, the sleeving 45 is cast in situ of concrete, resin or the like. The wall tie of the invention is simple to assemble and proof load. The compactable sleeve will readily deform to anchor the bar in position. The sleeve can be used only once and the bar or bars can be recovered for reuse.

The invention is illustrated by the following examples of a non-limitative character:

EXAMPLE 1

A body 8 according to FIG. 1 was cast in a mould as a set blend of graded sand and measures 150 mm in length, 35 mm in outside diameter and an internal diameter of 18 mm. A borehole 38 mm in diameter was drilled in a concrete block 60N/mm$^2$ compressive strength. A bolt was point anchored in the borehole using a nut 5 having a head 37 mm in diameter. The bolt was loaded up to 4 tons. After one week the point anchored bolt was tested and the load was found to be the same.

EXAMPLE 2

A borehole 38 mm in diameter and 1.8 m long was drilled in the roof of a gallery in a coal mine. A body of silicate bonded graded aggregate was cast on to a length of a bolt according to FIG. 1 to form a sleeve 34 mm in diameter and 270 mm long. The sleeve was cast using a composition comprising as particulate material (parts by weight)

| | | |
|---|---|---|
| emery aggregate | 0.4–3 mm | 61 |
| emery aggregate | 3–5 mm | 24.7 |
| emery aggregate | 1–3 mm | 6.8 |
| and a bonding agent comprising sodium silicate solution $Na_2O:SiO_2$ (3.41:1) | | 6.7 |
| and a hardener comprising glycerol triacetin | | 0.8 |

The bolt 1 had an ultimate tensile strength of 12 tonnes. The bolt was inserted into the borehole B, sleeved end leading, until it reached the blind end of the hole. The bolt 1 was then rotated and this caused the particles at the surface of the body to abrade against the borehole wall to lock the body 8 against rotation. Continued rotation of the bolt compressed the sleeve between the nut 5 and the plate 4 and the particles moved closer together to form a load bearing annulus between the bolt 1 and the borehole wall B. A load of 5 to 6 tonnes was immediately applied and the anchorage held. Later the bolt was removed without difficulty for re-use.

EXAMPLE 3

A borehole was drilled in a roof of a gold mine. A preformed body in the form of a sleeve 34 mm in diameter and 270 mm long of bonded particulate material was secured to a bar 14.5 mm in diameter and 1.8 m long and having a shape as in FIG. 1 but the plate was movable. The bar was placed in the hole, sleeved end leading. A pipe was passed up the bar and urged upwardly to compress the sleeve to overcome the bonding force and compact the particles. The pipe was then removed. When the bar had been point anchored in this way, the bar was subjected to torque and a load of 10 tons was applied without adverse effect.

EXAMPLE 4

A borehole 38 mm in diameter and 1.8 m long was drilled in a roof in a coal mine. A ferrule was swaged to the end of a length of wire rope having an ultimate tensile strength of 18 tons. A plate was then slipped on to the rope to abut the ferrule. A sleeve of ester hardened silicate bonded graded angular sharp sands 34 mm in diameter and 270 mm long was passed on to the rope to abut the plate, and another plate was then located at the free end face of the sleeve. The rope was then placed in the hole, sleeved end leading. A pipe was passed up the hole about the rope and forced up by pressure from a hydraulic jack to compress the sleeve to a length of 200 mm i.e. to shorten the sleeve by 70 mm. The pressure overcame the bonding force of the silicate bonding and the particles were compacted to form a load bearing annulus. A pull load of 14 tons was applied.

We claim:

1. An anchor element to be anchored in a borehole in a substrate, the element comprising an elongate bolt, the bolt having a threaded end portion, a threaded nut being in engagement with the threaded end portion of the blot, the nut including a head of a diameter substantially equal to that of the borehole, a plate being mounted on the bolt towards the threaded portion thereof, a generally cylindrical body being mounted on the bolt and extending between the plate and the nut, the body comprising particles of a particulate material having a high resistance to crushing, the particles being held together by weak bonding forces, whereby on rotation of the bolt relative to the nut the body is subjected to axial compression between the head and the plate to that the weak bonding forces are overcome and the body loses its integrity and the particles of the body are moved closer together to form a load bearing annulus between the wall of the borehole and the bolt.

2. An element according to claim 1, wherein the bonding of the particulate material is a chemical bonding.

3. An element according to claim 1, wherein the bonding agent is a silicate.

4. A anchor element according to claim 3, wherein the bonding agent is hardened by means of an organic hardener.

5. An element according to claim 1, wherein the particulate material has an aggregate crushing value as measured by BS812 crushing test of about 10.

6. An element according to claim 5, wherein the particles are angular in shape.

7. An element according to claim 1, wherein the particulate material of high crushing value is a blend of sands, coal dust, aggregate, gravel and slag.

8. An element according to claim 1, wherein the end of the bolt remote from the threaded end is shaped to act as a support.

9. An element according to claim 8, wherein the end of the bolt remote from the threaded end is shaped is shaped to form engaging means.

10. An element according to claim 1, wherein a plate is present at each end of the body, the plate being of substantially the same diameter as the body, and one plate is arranged to be urged towards the other to compact the body and cause the particles thereof to move closer together.

* * * * *